United States Patent
Qiu et al.

(10) Patent No.: US 11,734,551 B2
(45) Date of Patent: Aug. 22, 2023

(54) DATA STORAGE METHOD FOR SPEECH-RELATED DNN OPERATIONS

(71) Applicant: CHIPINTELLI TECHNOLOGY CO., LTD, Chengdu (CN)

(72) Inventors: Zhaoqiang Qiu, Chengdu (CN); Lai Zhang, Chengdu (CN); Fujun Wang, Chengdu (CN); Wei Tian, Chengdu (CN); Yingbin Yang, Chengdu (CN); Yangyang Pei, Chengdu (CN)

(73) Assignee: CHIPINTELLI TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 17/547,857

(22) Filed: Dec. 10, 2021

(65) Prior Publication Data

US 2022/0284276 A1 Sep. 8, 2022

(30) Foreign Application Priority Data

Mar. 8, 2021 (CN) .......................... 202110249408.2

(51) Int. Cl.
*G06F 3/06* (2006.01)
*G06N 3/063* (2023.01)

(52) U.S. Cl.
CPC ............. *G06N 3/063* (2013.01); *G06F 3/061* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | |
|---|---|---|
| 10,175,980 B2 | 1/2019 | Temam et al. |
| 10,354,733 B1 | 7/2019 | Zejda et al. |
| 10,592,801 B2 | 3/2020 | Chen et al. |
| 10,678,479 B1 | 6/2020 | Diamant et al. |
| 2014/0142929 A1* | 5/2014 | Seide ................. G06N 3/08 704/202 |

(Continued)

OTHER PUBLICATIONS

May 28, 2021 Notification to Grant Patent Right for Invention issued in Chinese Patent Application No. 202110249408.2.

(Continued)

*Primary Examiner* — Elias Mamo
(74) *Attorney, Agent, or Firm* — Oliff PLC (57) ABSTRACT

A data storage method for speech-related deep neural network (DNN) operations, characterized by comprising the following steps: 1. determining the configuration parameters by a user; 2. configuring a peripheral storage access interface; 3. configuring a multi-transmitting interface of feature storage array; 4. enabling CPU to store to-be-calculated data in a storage space between the feature storage space start address and the feature storage space end address of the peripheral storage device; 5. after data storage, enabling CPU to check the state of the peripheral storage access interface and the multi-transmitting interface of feature storage array; 6. upon receiving a transportation completion signal of the peripheral storage access interface by CPU, enabling the multi-transmitting interface of feature storage array. 7. upon receiving a transportation completion signal of the multi-transmitting interface of feature storage array by CPU, repeating step 6.

2 Claims, 5 Drawing Sheets

(56) References Cited

U.S. PATENT DOCUMENTS

| | | | |
|---|---|---|---|
| 2014/0257803 A1* | 9/2014 | Yu | G06N 3/084 |
| | | | 704/232 |
| 2014/0257804 A1* | 9/2014 | Li | G10L 15/16 |
| | | | 704/232 |
| 2018/0040333 A1* | 2/2018 | Wung | G10L 21/0232 |
| 2020/0082215 A1 | 3/2020 | Aliabadi et al. | |

OTHER PUBLICATIONS

Apr. 9, 2021 Office Action issued in Chinese Patent Application No. 202110249408.2.

* cited by examiner

DATA STORAGE METHOD FOR SPEECH-RELATED DNN OPERATIONS

TECHNICAL FIELD

The present invention belongs to the technical field of speech-related neural networks, and relates to a data storage management technology of speech-related neural networks, in particular to a data storage method for speech-related deep neural network (DNN) operations.

BACKGROUND

The feature storage requirement of speech-related DNN operations is featured with the continuity of data, that is, the speech-related data are packaged in frames, and each frame contains the same number of continuous data, which requires data to be stored in frames.

The feature storage requirement of speech-related DNN operations is featured with the timeliness of data, that is, the speech-related data stored in a speech-related storage unit needs to complete the throughput of data storage to the operation unit in a limited time, which is usually a matrix operation in the DNN operations.

The feature storage requirement of speech-related DNN operations is featured with the selectivity of data, that is, a corresponding number of initial frames may be specified when the data stored in a speech-related storage unit needs to be stored in an operation unit.

In the prior art, one of the most common implementation methods is to store data in a peripheral storage device or medium and read data through a general CPU, which is inefficient and cannot meet the above requirement of continuity, timeliness and selectivity; specifically, the initial position of frames needs to be processed by an extra calculation program, which cannot guarantee continuity and selectivity of data; and serial reading creates a bandwidth bottleneck, resulting in long operation time.

In the prior art, another implementation method is to use a graphics processor (GPU) or DSP which performs operations by a register file and a general SIMD form. However, due to the limited internal storage, GPU has to get accessed to a peripheral storage device frequently, which cannot meet the requirements for timeliness. In essence, GPU or DSP is still a general processing unit, and programs are frequently involved in the calculation for the purpose of the continuity and selectivity; as a result, the continuity and selectivity cannot be guaranteed.

To sum up, general CPU, DSP or GPU cannot match the DNN storage well in terms of continuity, timeliness and selectivity of data.

SUMMARY OF THE INVENTION

To overcome the defects in the prior art and improve the data storage speed, the present invention discloses a data storage method for speech-related DNN operations.

The data storage method for speech-related DNN operations of the present invention includes the following steps:

step 1. determining the configuration parameters by a user, in particular:

determining total frames, skipped frames, output channels and single channel output frames, number of data of unit frame required for DNN operations, depth of data of unit memory of feature storage array, and number of memories for storing data of unit frame, of the feature data to be calculated;

the depth of data of unit memory of the feature storage array representing the upper limit of data stored in a unit memory;

and satisfying the following formula: the depth of data of unit memory of feature storage array in a feature storage device is greater than or equal to the number of data of unit frame required for DNN operations; and determining a feature storage start address, a feature storage space start address and a feature storage space end address used for the operation in a peripheral storage device, which satisfy the following conditions: number of memories for storing data of unit frame×depth of data of unit memory≥number of data between feature storage space start address and feature storage space end address; and feature storage space end address≥feature storage start address≥feature storage space start address;

step 2. configuring a peripheral storage access interface; enabling CPU to configure the total frames of feature data to be calculated and the number of data of unit frame required for DNN operations of the peripheral storage access interface, as well as the feature storage start address, the feature storage space start address and the feature storage space end address of the peripheral storage device according to step 1;

step 3. configuring a multi-transmitting interface of feature storage array;

enabling CPU to configure the skipped frames, the output channels and the single channel output frames of the multi-transmitting interface of feature storage array, according to step 1;

configuring the initial frame number of each channel of the multi-transmitting interface of feature storage array according to the following formula:

Initial frame number of each channel=1+(channel number−1)×(skipped frames+1)

step 4. enabling CPU to store to-be-calculated data in a storage space between the feature storage space start address and the feature storage space end address of the peripheral storage device;

step 5: after data storage, enabling CPU to check the state of the peripheral storage access interface and the multi-transmitting interface of feature storage array; if both are in initial state, proceeding to step 51: enabling the peripheral storage access interface; afterwards, from the feature storage start address determined in the peripheral storage device, transporting the data between the feature storage space start address and the feature storage space end address in the peripheral storage device to a feature storage array, and sending a transportation completion signal of the peripheral storage access interface to CPU;

step 52: if both are not in initial state, waiting until the peripheral storage access interface and the multi-transmitting interface of feature storage array return to initial state, and then proceeding to step 51;

step 6. upon receiving a transportation completion signal of the peripheral storage access interface by CPU, enabling the multi-transmitting interface of feature storage array, so that the multi-transmitting interface of feature storage array starts to transport data in parallel according to the configuration requirements;

the method for transporting data in parallel includes the following steps: channels of the multi-transmitting interface of feature storage array receive data of single frame simultaneously, and the initial frame received by each channel is the initial frame number determined in step 3 until all the frame data in the feature storage array are transported, and simultaneously the multi-transmitting interface of feature storage array sends a transportation completion signal to CPU;

upon receiving a transportation completion signal of the peripheral storage access interface by CPU, storing the new data to be calculated in the storage space between the feature storage space start address and the feature storage space end address of the peripheral storage device for the next calculation; and step 7. upon receiving a transportation completion signal of the multi-transmitting interface of feature storage array by CPU, determining whether the new data to be calculated have been stored completely; if so, enabling the peripheral storage access interface, and repeating step 6; if not, waiting until the calculated data have been stored completely, enabling the peripheral storage access interface, and repeating step 6.

Preferably, the data transportation follows the process of sequence 1, sequence 2 and sequence 3 in the transportation process of step 5, wherein sequence 1 starts from a feature storage start address to a feature storage space start address, sequence 2 starts from a feature storage space start address to a feature storage space end address, and sequence 3 starts from a feature storage space end address until the transportation process is completed.

Compared with the prior art, the present invention has the following advantages:

1. The parameter configuration of the peripheral storage device allows data to be transported to the feature storage array in the specified peripheral address area according to the specified frame format, ensuring the continuity of feature data. The feature storage array cooperates with a multi-transmitting access interface of feature storage array, so that the multi-transmitting access interface of feature storage array determines the initial frame number of each output channel, finds a corresponding initial frame from the sequential frame data stored in the feature storage array and sends the initial frame, by which method the number of memories is greatly reduced, different from the traditional serial mode in which the frames of each channel need to be stored sequentially in a memory for real-time processing.

2. The configuration management method of a peripheral storage device access interface includes a communication method between a feature storage device of the neural network and external devices; upon the completion of parameter configuration, the interface is enabled, and the feature data starts to be transported by a peripheral storage device via the peripheral storage access interface and finally reaches the feature storage array, until the external device is notified of the complete transportation through a completion signal. Up to the completion of transportation, the feature data can be filled with new external storage data in parallel. The management method of single configuration and centralized transportation not only takes into account the data format requirements of peripheral storage device and deep neural network, but also reduces the data transmission time and the demand interval of the effective storage time of peripheral data compared with traditional methods, thus ensuring the validity and timeliness of feature data.

3. The configuration management of the multi-transmitting access interface of feature storage array achieves the transmission of feature data of multiple DNN operations in a unified time, thus shortening the time of DNN operations of specified data and ensuring the timeliness of data; the feature data are arranged in the order of frames to ensure the continuity of data; and the initial frame number of each neural network operation is arranged according to the rule of frame skipping, which meets the data selectivity of neural network operations.

4. The configuration management method of the multi-transmitting access interface of feature storage array includes the communication method between a feature storage device of the neural network and external computing device; according to the computing characteristics of the deep neural network, the multi-transmitting interface of feature storage array can send out the same data series, or can be closed according to the actual requirements, and a peripheral storage device can be accessed to a special interface to update the data, which is very flexible and convenient for application.

BRIEF DESCRIPTION OF THE DRAWINGS

In FIGS. 2, 3 and 4, the abscissa represents time and the ordinate represents events, CA represents the time required to calculate the data address, F represents the data acquisition time, EX represents the time to execute the operation, DRT ( ) represents the time to release the data in brackets, F1, F2 . . . FN represent the number of different feature frames; and $X_1, X_2, \ldots X_8$ represent different vectors.

DETAILED DESCRIPTION OF THE PREFERRED EMBODIMENT

The specific embodiments of the present invention will be further described in detail below.

Figure 6:
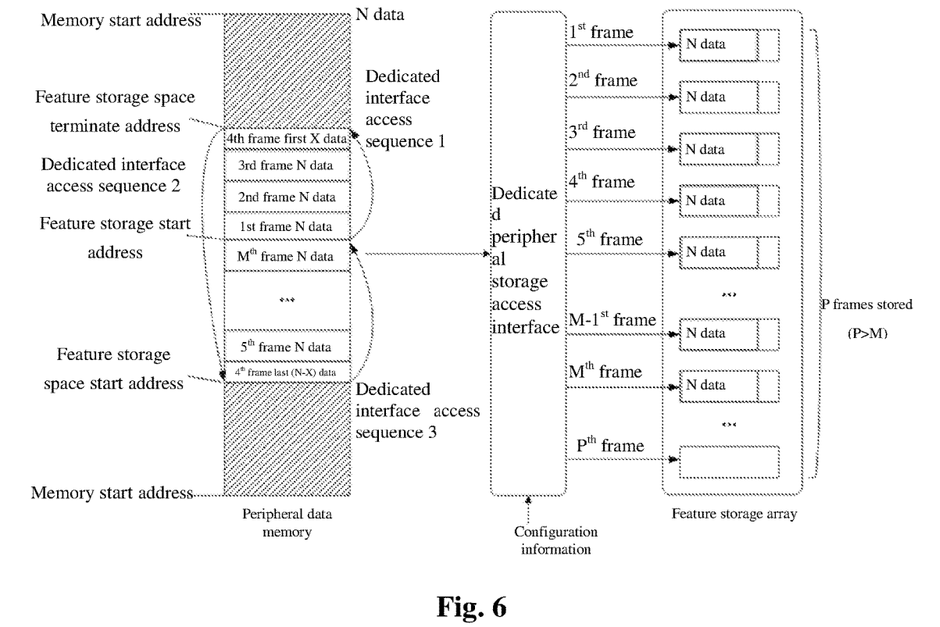
FIG. 6 is a schematic diagram of a specific embodiment of the management structure of the special interface for accessing peripheral storage devices in the present invention.

The storage management method for speech-related DNN operation chip of the present invention includes the following steps:

step 1. determining the configuration parameters by a user, in particular:

determining total frames, skipped frames, output channels and single channel output frames, of the feature data to be calculated, which are defined by the user according to the calculation requirements;

determining the number of data of unit frame required for DNN operations, which is defined by the user according to the calculation requirements, but should satisfy the following formula: the depth of data of unit memory of feature storage array in a feature storage device is greater than or equal to the number of data of unit frame required for DNN operations; and determining a feature storage start address, a feature storage space start address and a feature storage space end address used for the calculation in a peripheral storage device, which satisfy the following conditions: number of memories for storing data of unit frame×depth of data of unit memory≥number of data between feature storage space start address and feature storage space end address; and feature storage space end address≥feature storage start address≥feature storage space start address;

step 2. configuring a peripheral storage access interface;

enabling CPU to configure the total frames of feature data to be calculated and the number of data of unit frame required for DNN operations of the peripheral storage access interface; as shown in FIG. 6, when the total frames of feature data to be calculated is set to M frames, the peripheral storage access interface sequentially transports the M frames to the feature storage array according to the data storage characteristics of the peripheral storage device; wherein the total data frames P accommodated in the storage feature storage array should be greater than or equal to the target transportation feature data frames M.

Figure 7:
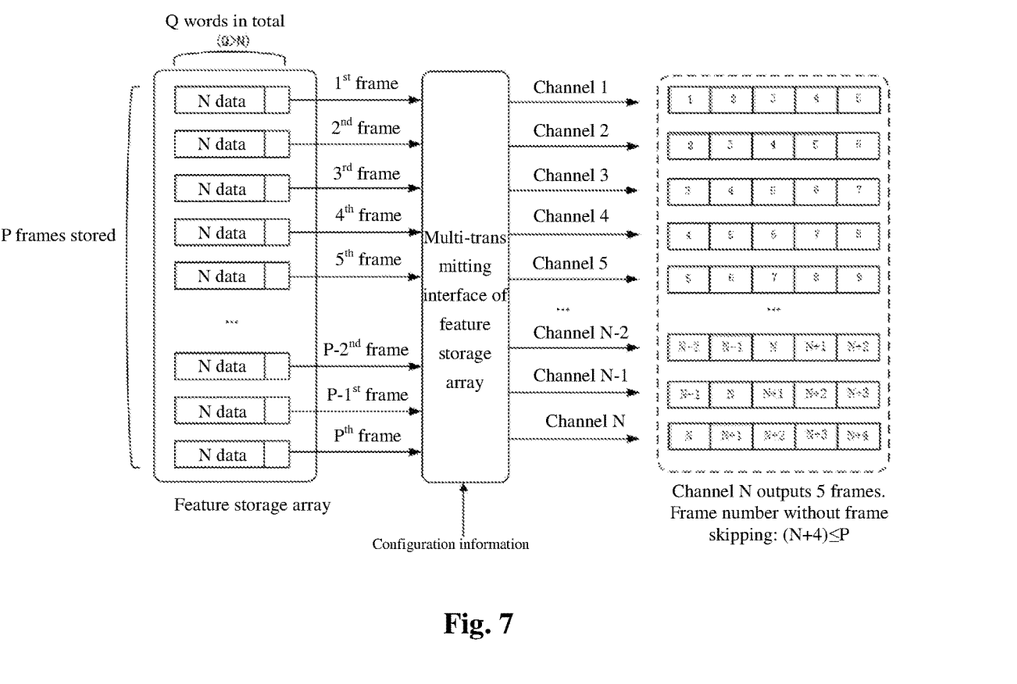
FIG. 7 is a schematic diagram of a specific embodiment of the management structure of the multi-transmitting interface of feature storage array without frame skipping in the present invention.

The format of data stored in the feature storage array is determined by the number of data of unit frame. Specifically, as shown in FIG. 7, when the number of data in each frame is N, the peripheral storage access interface will store the N data in the feature frame memory of the corresponding frame number according to the configuration information; upon the completion of storage action of the frame, the subsequent N data will be stored in the feature frame memory of the corresponding next frame number until all the scheduled features are transported; and the memory depth Q in the feature storage array should be greater than or equal to the number N of data of unit frame.

CPU configures the feature storage start address, the feature storage space start address and the feature storage space end address of a peripheral storage device to the peripheral storage access interface, wherein the peripheral storage device refers to a storage device (e.g. SRAM) other than the feature storage array and the feature storage array interface of the present invention. As shown in FIG. 7, since data are distributed in different addresses of a memory, the data storage sequence is as follows: sequence 1, starting from the feature storage start address, i.e. storing data from the feature storage start address to the feature storage space start address, followed by sequence 2, i.e. storing data from the feature storage space start address to the feature storage space end address, and sequence 3, i.e. storing data from the feature storage space end address, until all data are stored.

Accordingly, the data transportation follows the process of sequence 1, sequence 2 and sequence 3.

The data transportation in the above sequence takes into account the processing flexibility of applications, that is, a start address is set inside the feature storage space; when the data stored in the peripheral storage device is not a continuous frame arranged by time or is a continuous frame arranged by time, but the calculation should start from the middle frame, the application can set a start address to transport the corresponding data for calculation according to actual scenario requirements, which is convenient for meeting various complicated speech-related data calculation requirements.

In the transport process of the peripheral storage device, the peripheral storage access interface initiates an operation to provide violation protection. Specifically, as shown in FIG. 7, when data are transported to the fourth frame, if the peripheral storage access interface detects the feature storage space start address, the transport pointer will automatically jump to the feature storage space end address, without additional intervention of the peripheral device. The corresponding feature storage start address should be greater than or equal to the feature storage space start address and less than the feature storage space end address; that is to say, the following condition is met: feature storage space end address≥feature storage start address≥feature storage space start address.

step 3. configuring a multi-transmitting interface of feature storage array;

enabling CPU to configure the skipped frames, the output channels and the single channel output frames of the multi-transmitting interface of feature storage array;

configuring the initial frame number of each channel of the multi-transmitting interface of feature storage array according to the following formula:

initial frame number of each channel=1+(channel number−1)×(skipped frames+1)

If the initial frame is configured on the basis of the formula, the multi-transmitting interface of feature storage array can grab a corresponding frame in parallel from the sequentially arranged feature storage array according to the frame skipping requirements and the initial frame number of each channel, and output the corresponding frame, by which method the number of memories is greatly reduced compared with traditional CPU and DSP which require the data of each channel to be serially stored in a storage array, ensuring the real-time processing requirements.

Figure 8:
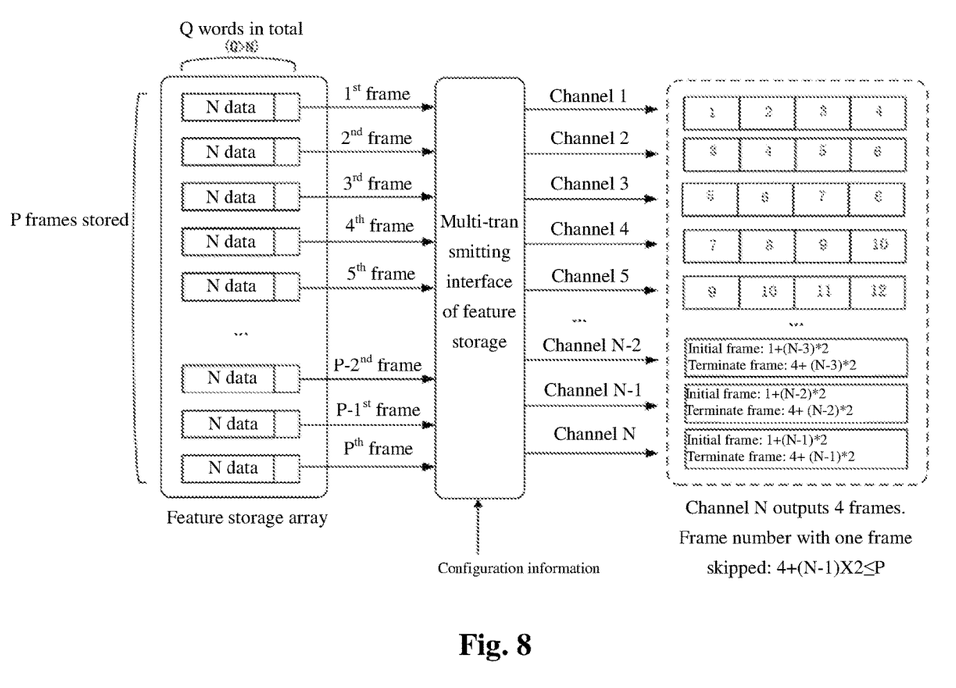
FIG. 8 is a schematic diagram of a specific embodiment of the management structure of the multi-transmitting interface of feature storage array with frame skipping in the present invention.

As shown in FIG. 7, without frame skipping, the initial frame number of the first channel is 1, and the initial frame number of other channels is arranged according to the rule that the initial frame number of the previous channel is sequentially increased by 1. As shown in FIG. 8, with one frame skipped, the initial frame number of the first channel is 1, and the initial frame number of other channels is arranged according to the rule that the initial frame number of the previous channel is sequentially increased by 2. The output channels and the single channel output frames in the multi-transmitting interface of feature storage array are configured as shown in FIGS. 7 and 8; and the single channel output frames control the number of frames continuously transmitted by each channel. The single channel output frames are configured as 4 and 5 in FIGS. 7 and 8. The output channels are the number of channels for parallel transmission of feature data from the feature storage array. The single channel output frames, the output channels and the skipped frames determine the number of memories for storing data of unit frame; and the number of memories for storing data of unit frame should be less than the total number of memories in a memory array.

The number of memories for storing data of unit frame, the skipped frames, the channels to be enabled and the single channel output frames shall conform to the following formula:

Number of memories for storing data of unit frame= (skipped frames+1)×(number of channel to be enabled−1)+single channel output frames Total number of memories in memory array≥number of memories for storing data of unit frame step 4. enabling CPU to store to-be-calculated data in a storage space between the feature storage space start address and the feature storage space end address of the peripheral storage device;

step 5: after data storage, enabling CPU to check the state of the peripheral storage access interface and the multi-transmitting interface of feature storage array; if both are in initial state, proceeding to step 51: enabling the peripheral storage access interface; afterwards, from the feature storage start address determined in the peripheral storage device, transporting the data between the feature storage space start address and the feature storage space end address in the peripheral storage device to a feature storage array, and sending a transportation completion signal of the peripheral storage access interface to CPU;

step 52: if both are not in initial state, waiting until the peripheral storage access interface and the multi-transmitting interface of feature storage array return to initial state, and then proceeding to step 51;

step 6. upon receiving a transportation completion signal of the peripheral storage access interface by CPU, enabling the multi-transmitting interface of feature storage array, so that the multi-transmitting interface of feature storage array starts to transport data in parallel according to the configuration requirements; the method for transporting data in parallel includes the following steps: channels of the multi-transmitting interface of feature storage array receive data of single frame simultaneously, and the initial frame received by each channel is the initial frame number determined in step 3 until all the frame data in the feature storage array are transported, and the multi-transmitting interface of feature storage array sends a transportation completion signal to CPU; at the same time, upon receiving a transportation completion signal of the peripheral storage access interface by CPU, storing the new data to be calculated in the storage space between the feature storage space start address and the feature storage space end address of the peripheral storage device for the next calculation; and step 7. upon receiving a transportation completion signal of the multi-transmitting interface of feature storage array by CPU, determining whether the new data to be calculated have been stored completely; if so, enabling the peripheral storage access interface, and repeating step 6; if not, waiting until the calculated data have been stored completely, enabling the peripheral storage access interface, and repeating step 6.

Figure 1:
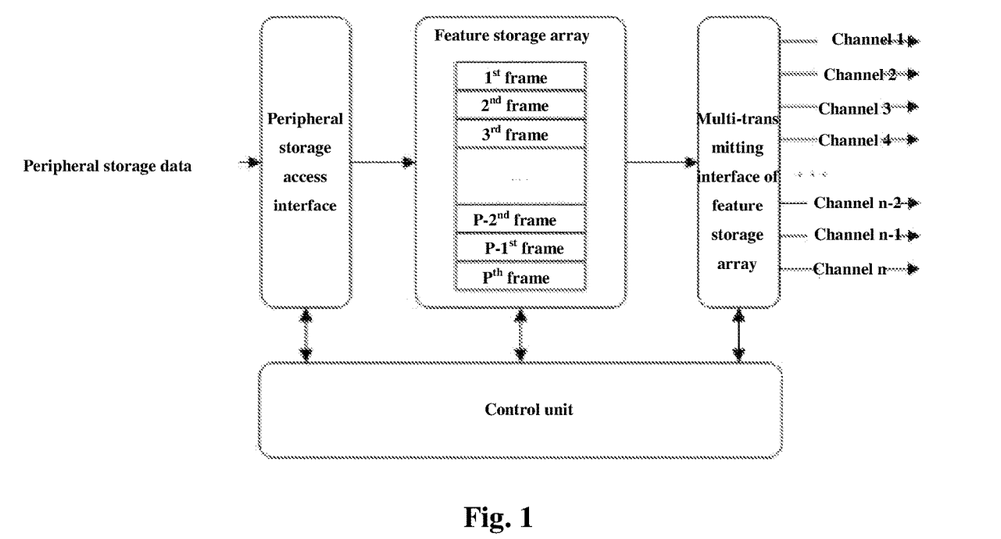
FIG. 1 is a data trend diagram in a specific embodiment according to the data storage method of the present invention.
Figure 2:
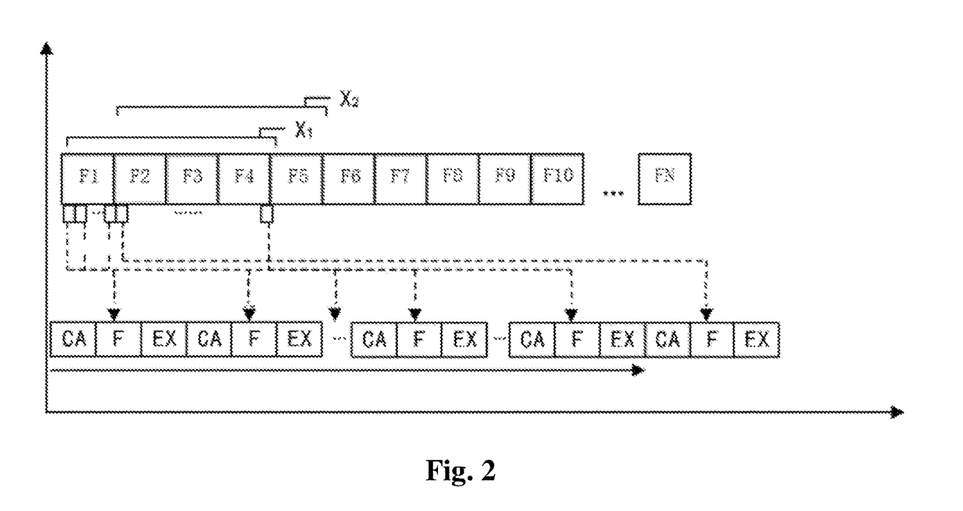
FIG. 2 shows a specific data reading mode when a CPU is used for processing DNN operations in the prior art.
Figure 3:
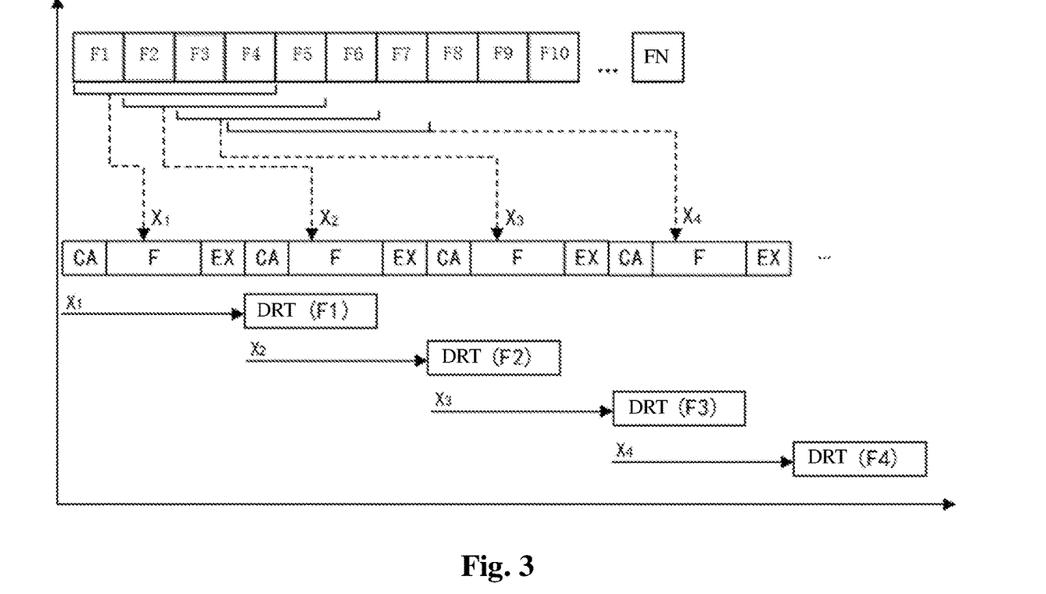
FIG. 3 shows a specific data reading mode when a DSP or GPU is used for processing DNN operations in the prior art.

In the above method, if the DNN operation is processed by CPU only, as shown in FIG. 2, the reading expression is of single data; for example, at the moment of reading the feature vector F1, a CPU user will pay attention to the data arrangement from the $1^{st}$ to the $M^{th}$ latitude in the vector (the time spent on address calculation is CA in the address calculation stage) and its coordination with a multiplied vector, and a large number of feature data address calculations will cause inconvenience in the continuous maintenance of data reading during use; moreover, since operations are based on single data granularity, when CPU is configured to process the deep neural calculation, the user will take additional means, such as counting, to find out whether the output of the target feature is completed or not.

Data can only be read into a device for processing one by one because of the characteristics of CPU. When one data is processed, i.e. a unit dimension is processed, the following calculations are carried out: time to acquire the data address, time to acquire data from a peripheral device, and time to output the data to other devices after the data is read in and processed; wherein the time is counted by several clock cycles, in fact, the time consumed by CPU is several times of GPU and the present invention. Wherein, for convenience of explanation, it is assumed that CPU, GPU and the present invention are equal in all aspects, such as address calculation time, data acquisition time and data output time.

Let the processing time of unit feature vector of DNN of a CPU be T, the number of feature frames be FN, the number of data of unit frame be N, the address calculation time be CA, the data acquisition time be F, and the data output time be EX, and correspondingly, let the release time TDRT of singular data of peripheral storage device be SN, the following equations are obtained:

$T=FN \times N \times (CA+F+EX)$ $TDRT=N \times (SN+1)/T$

I.e., unit feature vector processing time=number of feature frames×unit frame dimension×(address calculation time+data acquisition time+data output time); data release time of peripheral storage device=data of unit frame× (skipped frames+1)/T.

Figure 4:
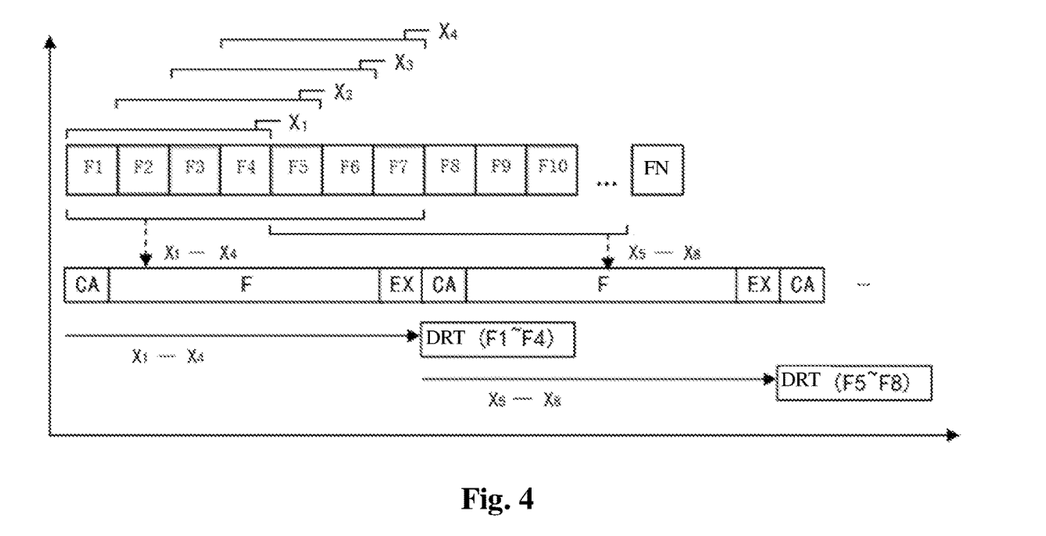
FIG. 4 shows a specific data reading mode after data are processed by a parallel channel in the present invention.

DSP and GPU are relatively better than CPU in processing DNN operations. As shown in FIG. 4, DSP or GPU can process data in frames. For example, data F1, F2, F3 and F4 of all frames of vector $X_1$ can be read in once, which ensures the continuity of single data reading but has a problem, i.e. DSP and GPU users still need to calculate addresses according to frame granularity to maintain data continuity; moreover, when performing DNN operations by DSP and graphics processor, users will take additional means, such as counting to get whether the output of the target feature is completed, by which only the calculation frequency is reduced compared with CPU processing. It should be noted that DSP and GPU are not dedicated DNN processing units, and the storage space of each temporary storage unit in the DSP and GPU is limited; when the DNN features involve a large number of frames, the processing of related vectors needs to be further disassembled according to CPU processing form, causing the deterioration of data continuity towards CPU processing DNN operations.

Different from CPU processing mode, the GPU processing mode described above can read data in vector units, and the time required to process a vector is, $TDRT=N \times (SN+1)/T$ I.e., data release time of peripheral storage device=data of unit frame×(skipped frames+1)/T $T=CA+FN \times N \times F+EX;$ I.e., unit feature vector processing time=address calculation time+number of feature frames×unit frame dimension× data acquisition time+data output time As shown in FIG. 4, if a vector is composed of 4 frames and one frame has M dimensions, then the processing time of the unit vector is:

$T$=address calculation time+4 frames×$M$ dimension× data acquisition time+data output time Since this method is still based on single vector processing sequence, $X_2$ can be processed only after the processing of vector $X_1$, and then only the non-overlapping memory parts of $X_1$ and $X_2$ can be released after each vector is processed:

Compared with CPU processing mode, the advantage of the processing mode lies in saving the address calculation time and output time; that is, one takes the data dimension as a processing unit and the other takes the unit vector as a processing unit.

Figure 5:
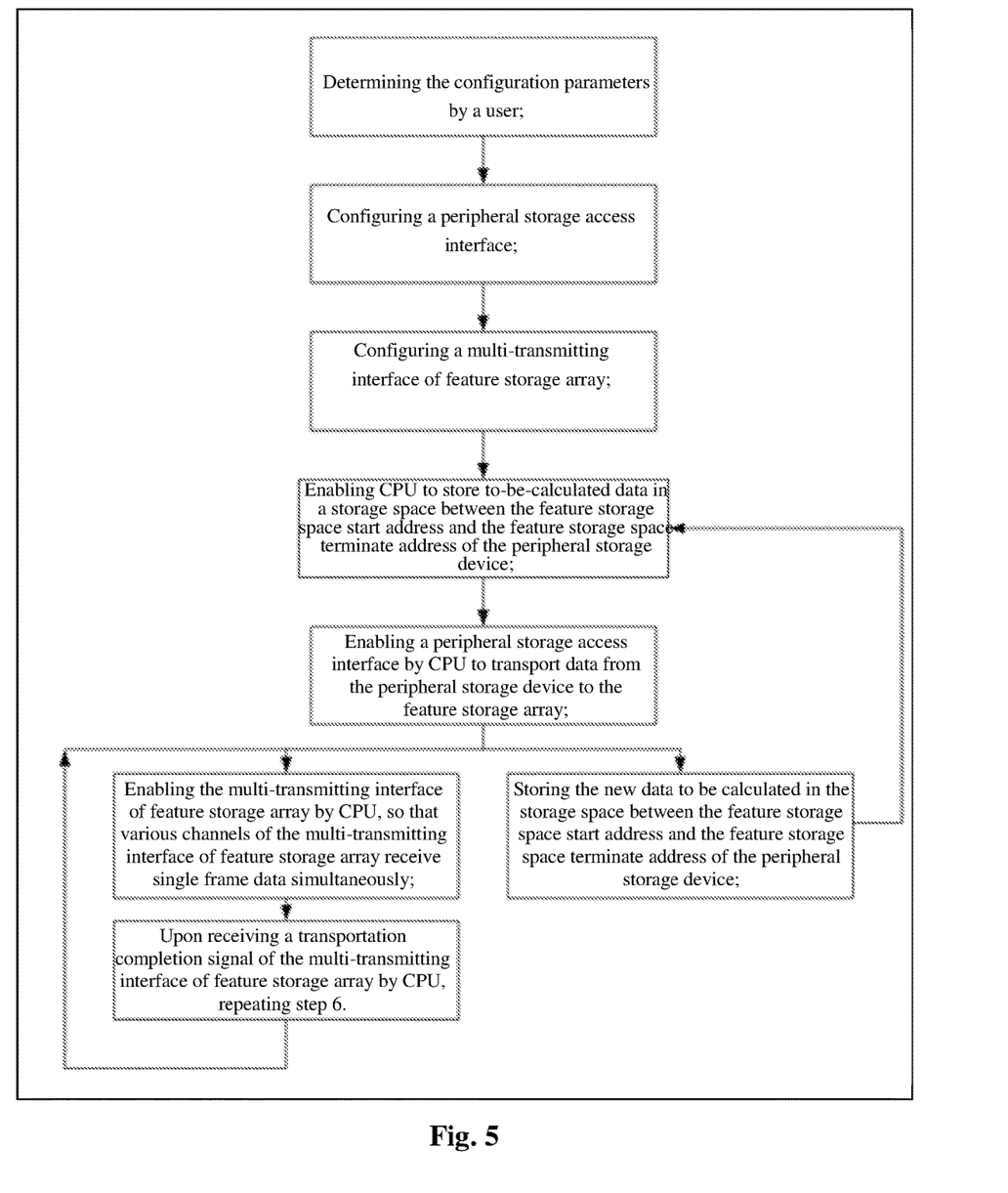
FIG. 5 is a specific flow diagram of the data storage method according to the present invention.

The configurable method provided by the present invention solves the problem of continuity of feature data in DNN operations; as shown in FIG. 5, the inventive method performs data continuity management according to the characteristics of DNN operations and parallel operation degree. The method only needs to read all the DNN operation feature data frames to be processed, which are embodied in the configuration parameters such as feature storage start address, feature storage space start address, feature storage space end address, number of transportation feature data frames, number of data of unit frame, or the like, so as to read the feature data via the peripheral storage device interface, which can be achieved by steps 1 to 7.

The configuration method provided by the present invention improves the data timeliness, enhances the data throughput and shortens the data reading and output efficiency. As shown in FIG. 5, the device of the present invention transports data according to feature data blocks; therefore, according to the above analysis method, let the number of parallel processing vectors be CHN, the response processing time per unit feature of the DNN is:

$$T=\{CA+FN\times N\times EX+[(SN+1)\times(CHN-1)+FN]\times N\}/CHN$$

According to the above processing time formula, it can be analyzed that the device of the present invention allocates the address operation time, i.e., configuration information, to the number of parallel processing vectors, and the data output time to the number of parallel processing vectors. On the basis of allocating the feature data reading time to the number of parallel processing vectors, the overhead of skipped frames is slightly increased. Since the DNN maintains a high standard for data continuity, the SN value of skipped frames is generally not very large. In case of high parallelism, skipped frames can be controlled within the acceptable range or even ignored, which shortens the parallel channels several times compared with CPU and GPU-related DNN operations.

Correspondingly, as shown in FIG. 5, the release time of peripheral space is optimized as follows: TDRT=FN×N/T, where the number of feature frames FN is far greater than the skipped frames SN, and the corresponding demand time is reduced by multiple, thus shortening the release time of peripheral space and significantly improving the efficiency of data timeliness.

Based on the parallel data output mode, the device of the present invention controls the initial frames of feature vectors by frame skipping and enables a channel by multi-channel parallel output to control whether the feature storage register array transmits the corresponding feature vectors, thus avoiding the data retransmission in the traditional mode (CPU, DSP and GPU), improving the data transmission speed, avoiding the corresponding data address calculation and improving the data management efficiency.

According to the present invention, the data in the feature storage array are transmitted by the multi-transmitting interface of feature storage array, so that the initial frame number can be output by the multi-transmitting interface of feature storage array in parallel according to the requirement of frame skipping, and the corresponding frame can be grabbed from the sequentially arranged feature storage array and output, by which method the number of memories is greatly reduced compared with traditional CPU and DSP which require the data of each channel to be serially stored in a storage array, ensuring the real-time processing requirements.

If 10 frames are processed without frame skipping, and the output channels are 4, then the traditional CPU processing mode is as follows: data are grouped and stored in the order of $1^{st}$, $2^{nd}$, $3^{rd}$ and $4^{th}$ frames, or $2^{nd}$, $3^{rd}$, $4^{th}$ and $5^{th}$ frames, or $3^{rd}$, $4^{th}$, $5^{th}$ and $6^{th}$ frames, or $4^{th}$, $5^{th}$, $6^{th}$ and $7^{th}$ frames, or $5^{th}$, $6^{th}$, $7^{th}$ and $8^{th}$ frames, or $6^{th}$, $7^{th}$, $8^{th}$ and $9^{th}$ frames, or $7^{th}$, $8^{th}$, $9^{th}$ and $10^{th}$ frames, and a total 28 memory units will be stored.

When the method is used in the above situation, only 10 memory units of the feature storage array should be provided, and each memory unit stores one frame in the order of $1^{st}$, $2^{nd}$, $3^{rd}$, $4^{th}$, $5^{th}$, $6^{th}$, $7^{th}$, $8^{th}$, $9^{th}$ and $10^{th}$ frames. At work, the multi-transmitting interface of feature storage array grabs and outputs the corresponding frames. For example, Channel 0 outputs the $1^{st}$, $2^{nd}$, $3^{rd}$ and $4^{th}$ frames sequentially from the first memory unit, Channel 1 outputs the $2^{nd}$, $4^{th}$ and $5^{th}$ frames sequentially from the second storage unit in parallel, Channel 2 outputs the $3^{rd}$, $4^{th}$, $5^{th}$ and $6^{th}$ frames sequentially from the third storage unit in parallel, and Channel 3 outputs the $4^{th}$, $5^{th}$, $6^{th}$ and $7^{th}$ frames sequentially from the fourth storage unit in parallel. Furthermore, when Channel 0 outputs the $1^{st}$, $2^{nd}$, $3^{rd}$ and $4^{th}$ frames and Channel 3 outputs corresponding frames, Channel 0 will continue to output the $5^{th}$, $6^{th}$, $7^{th}$ and $8^{th}$ frames; when Channel 1 outputs the $2^{nd}$, $3^{rd}$, $4^{th}$ and $5^{th}$ frames and Channel 0 outputs corresponding frames, Channel 1 will continue to output the $6^{th}$, $7^{th}$, $8^{th}$ and $9^{th}$ frames; and so on. Compared with the traditional sequential storage method, the parallel multi-transmission method described herein can greatly reduce the number of memories required.

The preferred embodiments of the present invention are described above. If they are not obviously contradictory or are premised on a preferred embodiment, the preferred embodiments can be used in any superposition and combination. The embodiments and specific parameters therein are only for clearly describing the invention verification process, not for limiting the scope of patent protection of the present invention. For the scope of patent protection of the present invention, the claims shall prevail. Any equivalent structural changes made according to the contents of the specification of the present invention should be included in the scope of protection of the present invention.

The invention claimed is:

1. A data storage method executed by a processor for speech-related deep neural network (DNN) operations, comprising the following steps:
   step 1: determining the configuration parameters by:
      determining total frames, skipped frames, output channels, single channel output frames, a number of data in unit frames required for DNN operations, a depth of data of unit memory of a feature storage array, and a number of memories for storing data of unit frames, of the feature data to be calculated;
      the depth of data of unit memory of the feature storage array representing the upper limit of data stored in a unit memory; and
      satisfying the following formula: the depth of data of unit memory of the feature storage array in a feature storage device is greater than or equal to the number of data in unit frames required for DNN operations; and
      determining a feature storage start address, a feature storage space start address, and a feature storage space end address used for the calculation in a peripheral storage device, satisfying the following conditions: the number of memories for storing data of unit frames×the depth of data of unit memory≥a number of data between the feature storage space start address and the feature storage space end address; and the feature storage space end address≥the feature storage start address≥the feature storage space start address;

step 2: configuring a peripheral storage access interface;
enabling the processor to configure the total frames of feature data to be calculated and the number of data in unit frames required for DNN operations of the peripheral storage access interface, and the feature storage start address, the feature storage space start address, and the feature storage space end address of the peripheral storage device, according to step 1;

step 3: configuring a multi-transmitting interface of the feature storage array;
enabling the processor to configure the skipped frames, the output channels, and the single channel output frames of the multi-transmitting interface of the feature storage array, according to step 1;
configuring the initial frame number of each channel of the multi-transmitting interface of the feature storage array according to the following formula:

initial frame number of each channel=1+(channel number−1)×(skipped frames+1), step 4: enabling the processor to store to-be-calculated data in a storage space between the feature storage space start address and the feature storage space end address of the peripheral storage device;

step 5: after performing data storage, enabling the processor to check the state of the peripheral storage access interface and the multi-transmitting interface of the feature storage array; if both are in an initial state, proceeding to step 5(1): enabling the peripheral storage access interface; afterwards, from the feature storage start address determined in the peripheral storage device, transporting the data between the feature storage space start address and the feature storage space end address in the peripheral storage device to a feature storage array, and sending a transportation completion signal of the peripheral storage access interface to the processor;

step 5(2): if both are not in initial state, waiting until the peripheral storage access interface and the multi-transmitting interface of feature storage array return to the initial state, and then proceeding to step 5(1);

step 6: upon receiving a transportation completion signal of the peripheral storage access interface by the processor, enabling the multi-transmitting interface of feature storage array, so that the multi-transmitting interface of feature storage array starts to transport data in parallel according to configuration requirements;
the method for transporting data in parallel comprising the following steps: channels of the multi-transmitting interface of feature storage array receive data of a single frame simultaneously, and the initial frame received by each channel is the initial frame number determined in step 3 until all the frame data in the feature storage array is transported, and simultaneously the multi-transmitting interface of the feature storage array sends a transportation completion signal to the processor;
upon receiving a transportation completion signal of the peripheral storage access interface by the processor, storing the new data to be calculated in the storage space between the feature storage space start address and the feature storage space end address of the peripheral storage device for the next calculation; and step 7: upon receiving a transportation completion signal of the multi-transmitting interface of the feature storage array by the processor, determining whether the new data to be calculated has been stored completely; if so, enabling the peripheral storage access interface, and repeating step 6; if not, waiting until the calculated data has been stored completely, enabling the peripheral storage access interface, and repeating step 6.

2. The data storage method executed by the processor for speech-related DNN operations according to claim 1, wherein the data transportation of step 5 follows a process of sequence 1, sequence 2 and sequence 3, wherein sequence 1 starts from a feature storage start address to a feature storage space start address, sequence 2 starts from a feature storage space start address to a feature storage space end address, and sequence 3 starts from a feature storage space end address until the transportation process is completed.

* * * * *